US012301373B2

(12) United States Patent
Chung et al.

(10) Patent No.: US 12,301,373 B2
(45) Date of Patent: May 13, 2025

(54) APPARATUS AND METHOD FOR USING MESSENGER SERVICE OF GROUP CHAT ROOM

(71) Applicant: KAKAO CORP., Jeju-si (KR)

(72) Inventors: Chang Min Chung, Seongnam-si (KR); Go En Choi, Seongnam-si (KR); Hyo Sun Kim, Seongnam-si (KR); Ju Ho Chung, Seongnam-si (KR); Yoo Hyuk Lim, Seongnam-si (KR); Yu Ju Im, Seongnam-si (KR); Hye Sun Kim, Seongnam-si (KR); Hyeon Woo Kim, Seongnam-si (KR); Euing Hyeok Kim, Seongnam-si (KR); Ah Seong Kim, Seongnam-si (KR); Soo Hun Park, Seongnam-si (KR); Tae Mi Kim, Seongnam-si (KR); Yoon A Heo, Seongnam-si (KR); Seung Sup Kim, Seongnam-si (KR); Dong Woon Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/339,689

(22) Filed: Jun. 22, 2023

(65) Prior Publication Data
US 2023/0421404 A1  Dec. 28, 2023

(30) Foreign Application Priority Data

Jun. 27, 2022  (KR) .......................... 10-2022-0078532

(51) Int. Cl.
*G06F 15/16*  (2006.01)
*H04L 12/18*  (2006.01)
*H04L 51/52*  (2022.01)

(52) U.S. Cl.
CPC .......... *H04L 12/1822* (2013.01); *H04L 51/52* (2022.05)

(58) Field of Classification Search
CPC . H04L 12/1822; H04L 12/1813; H04L 51/04; H04L 51/52; H04L 51/56; H04L 51/21; H04L 51/00
(Continued)

(56) References Cited

U.S. PATENT DOCUMENTS

2004/0078444 A1* 4/2004 Malik ..................... H04L 51/04
709/217
2006/0063552 A1* 3/2006 Tillet ...................... H04M 3/56
455/507

(Continued)

FOREIGN PATENT DOCUMENTS

JP       2019-000220 A    1/2019
KR   10-2013-0065781 A    6/2013
(Continued)

OTHER PUBLICATIONS

Office Action in Japanese Patent Application No. 10-2023-103993 issued on Jun. 11, 2024.
(Continued)

*Primary Examiner* — Kaylee J Huang
(74) *Attorney, Agent, or Firm* — Knobbe, Martens, Olson, & Bear, LLP

(57) ABSTRACT

A method for a first user terminal to use a messenger service of a group chat room is proposed. The method may include receiving, from a server, invitation information associated with a second user's inviting a first user to the group chat room, and displaying chat room information on the group chat room. The method may also include in response to the second user not being registered as a friend of the first user in the messenger service, displaying information on the
(Continued)

second user and an interface for deciding whether to participate in the group chat room. The method may further include acquiring an interaction regarding a decision to participate in the group chat room through the interface, and displaying a message created in the group chat room.

13 Claims, 14 Drawing Sheets

(58) Field of Classification Search
USPC .............................. 709/204, 206, 203, 217
See application file for complete search history.

(56) References Cited

U.S. PATENT DOCUMENTS

| | | | |
|---|---|---|---|
| 2007/0038758 A1* | 2/2007 | Mu | H04L 65/1104 709/227 |
| 2008/0034037 A1* | 2/2008 | Ciudad | G06Q 10/10 709/204 |
| 2009/0222523 A1* | 9/2009 | Williams | H04L 51/04 709/206 |
| 2012/0084353 A1* | 4/2012 | Herde | G06Q 30/02 709/203 |
| 2012/0110099 A1* | 5/2012 | Fujihara | H04L 12/1818 709/206 |
| 2013/0262574 A1* | 10/2013 | Cohen | H04L 12/1818 709/204 |
| 2016/0261537 A1* | 9/2016 | Yang | H04L 51/216 |
| 2021/0006519 A1* | 1/2021 | Taitz | G06F 3/14 |

FOREIGN PATENT DOCUMENTS

| | | |
|---|---|---|
| KR | 10-2014-0041757 A | 4/2014 |
| KR | 10-2021-0116865 A | 9/2021 |
| KR | 10-2022-0063038 | 5/2022 |
| WO | WO 2010/110155 A1 | 9/2010 |

OTHER PUBLICATIONS

Office Action in Korean Patent Application No. 10-2022-0078532 issued on Feb. 8, 2024.

* cited by examiner

APPARATUS AND METHOD FOR USING MESSENGER SERVICE OF GROUP CHAT ROOM

CROSS-REFERENCE TO RELATED APPLICATION

This application claims priority to and the benefit of Korean Patent Application No. 10-2022-0078532 filed on Jun. 27, 2022, the disclosure of which is incorporated herein by reference in its entirety.

BACKGROUND

Technical Field

The present disclosure relates to a technique for using a messenger service of a group chat room, and more particularly, to a technique for using a messenger service that provides settings for participating in a group chat room.

Description of Related Technology

The instant messaging service is a message transmitting/receiving service between two or more users using a network and is provided to the users through a client program called an instant messenger. Unlike existing instant messengers that send and receive text messages, it supports various functions such as sending and receiving various types of media files such as photos, videos, and voice files, and sending and receiving data in groups that can communicate with two or more other users at the same time. Instant messengers are becoming popular.

SUMMARY

An apparatus and method for using a messenger service of a group chat room of the present disclosure is intended to improve user convenience by undoing a user's participation in a group chat room, the participation which is against the user's intention.

In an aspect, there is provide a method for a first user terminal to use a messenger service of a group chat room, the method including: receiving, from a server, invitation information associated with a second user's inviting a first user to the group chat room; displaying chat room information on the group chat room; in response to the second user not being registered as a friend of the first user in the messenger service, display information on the second user and an interface for deciding whether to participate in the group chat room; acquiring an interaction regarding a decision to participate in the group chat room through the interface; and displaying a message created in the group chat room.

The message may include a message created after reception of the invitation information.

The method may further include determining whether the second user is registered as a friend of the first user in the messenger service.

The method may further include acquiring an interaction of selecting the group chat room, and the information on the second user and the interface may be displayed in response to acquiring the interaction of selecting the group chat room.

In addition, the method may further include in response to acquiring an interaction of selecting the group chat room, determining whether the second user is an overseas user, and in response to the second user being the overseas user, in the displaying of the interface, the information on the second user comprises an overseas user indicator indicating that the second user may be the overseas user.

A method for using a messenger service of a group chat room.

In response to the second user not being registered as a friend of the first user in the messenger service, the chat room information may include an invitation indicator indicating that it has not been decided whether to participate in the group chat room.

A method for using a messenger service of a group chat room.

In addition, the invitation indicator may be changed depending on properties of the group chat room in response to acquiring the interaction regarding the decision to participate in the group chat room through the interface.

In response to the second user being registered as a friend of the first user in the messenger service, the chat room information may include a message most recently created in the group chat room, and in response to the second user not being registered as a friend of the first user in the messenger service, the chat room information may not include the message most recently created in the group chat room.

In response to the second user not being registered as a friend of the first user in the messenger service, the chat room information may include a guide message indicating that an invitation event for the group chat room has occurred.

In addition, the guide message may be changed to a message most recently created in the group chat room in response to acquiring an interaction of a decision to participate in the group chat room through the interface.

In the displaying of the interface, information on a participant of the group chat room may be displayed.

The information on the participant may be displayed differently depending on whether the participant is registered as a friend of the first user in the messenger service.

The method may further include deleting the chat room information in response to acquiring an interaction regarding a decision to exit the group chat room through the interface.

In another aspect, there is provided a first user terminal using a messenger service of a group chat room, the first user terminal including: a memory; and a processor connected to the memory and configured to execute instructions contained in the memory. The processor is further configured to: receive, from a server, invitation information associated with a second user's inviting a first user to the group chat room; display chat room information on the group chat room; in response to the second user not being registered as a friend of the first user in the messenger service, display information on the second user and an interface for deciding whether to participate in the group chat room; acquire an interaction regarding a decision to participate in the group chat room through the interface; and display a message created in the group chat room.

The message may include a message created after reception of the invitation information.

A computer program according to an embodiment of the present disclosure may be combined with hardware and stored in a medium to execute the above method.

In yet another aspect, there is provided a method for a server to manage participation in a group chat room in a messenger service, the method including: receiving invitation information for inviting a first user to the group chat room from a second user terminal; providing participant-related information of the group chat room including the first user to a participant terminal based on the invitation information, wherein the participant terminal is a terminal of a participant of the group chat room; providing the first user terminal with the invitation information; providing the first user terminal with a message created in the group chat room; and in response to acquiring an exit response regarding the group chat room from the first user terminal, providing the participant terminal with update information on the participant-related information, wherein the update information comprises information indicating that the first user has exit the group chat room.

The message may be a message created after reception of the invitation information and displayed on the first user terminal in response to the first user terminal's acquiring an interaction regarding a decision to participate in the group chat room.

The method may further include, in response to providing the participant terminal with the participant-related information, providing the participant terminal with a participation notification message indicating that the first user is invited to the group chat room.

The method may further include: in response to acquiring a participation response regarding the group chat room from the first user terminal, providing the participant terminal with information that is to be changed as the first user confirms the message; and in response to acquiring an exit response regarding the group chat room from the first user terminal, providing the participant terminal with an exit notification message indicating that the first user has exited the group chat room.

The method may further include: determining whether a second user of the second user terminal is registered as a friend of the first user in the messenger.

In yet another aspect, there is provided a server for managing participation of a group chat room in a messenger service, the server including: a memory; and a processor connected to the memory and configured to execute instructions contained in the memory. The processor is further configured to perform the following operations: receiving invitation information for inviting a first user to the group chat room from a second user terminal; providing participant-related information of the group chat room including the first user to a participant terminal based on the invitation information, wherein the participant terminal is a terminal of a participant of the group chat room; providing the first user terminal with the invitation information; providing the first user terminal with a message created in the group chat room; and in response to acquiring an exit response regarding the group chat room from the first user terminal, providing the participant terminal with update information on the participant-related information, wherein the update information comprises information indicating that the first user has exit the group chat room.

The message may be a message created after reception of the invitation information and displayed on the first user terminal in response to the first user terminal's acquiring an interaction regarding a decision to participate in the group chat room.

DETAILED DESCRIPTION

As the use of instant messengers in user terminals such as mobile communication terminals and personal computers (PC) has been recently increasing, there is a demand for developing various and convenient instant messaging service technologies for sharing conversations and/or data with other participants by participating in a chatroom, of which there are a large number and a variety.

This instant messaging service supports a group chat session that allows simultaneous communication with two or more other users, and this service may be implemented by creating a group chat room in a user interface in a user terminal.

In general, in order to create a group chat session, a specific user creates a group chat room and invites other users, or when a participant already participating in the group chat room invites a new user, the invited user starts to participate in the group chat session as soon as being invited. However, there is no function to reject the invitation when the invited user does not want to participate in the chat session of the group chat room.

Hereinafter, embodiments of the present disclosure will be described in detail with reference to the accompanying drawings, and the same or similar components are given the same reference numbers and redundant description thereof is omitted. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, steps described may be performed regardless of a listed order, except for a case where they must be performed in the listed order due to a special causal relationship.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described with reference to the accompanying drawings.

Figure 1:
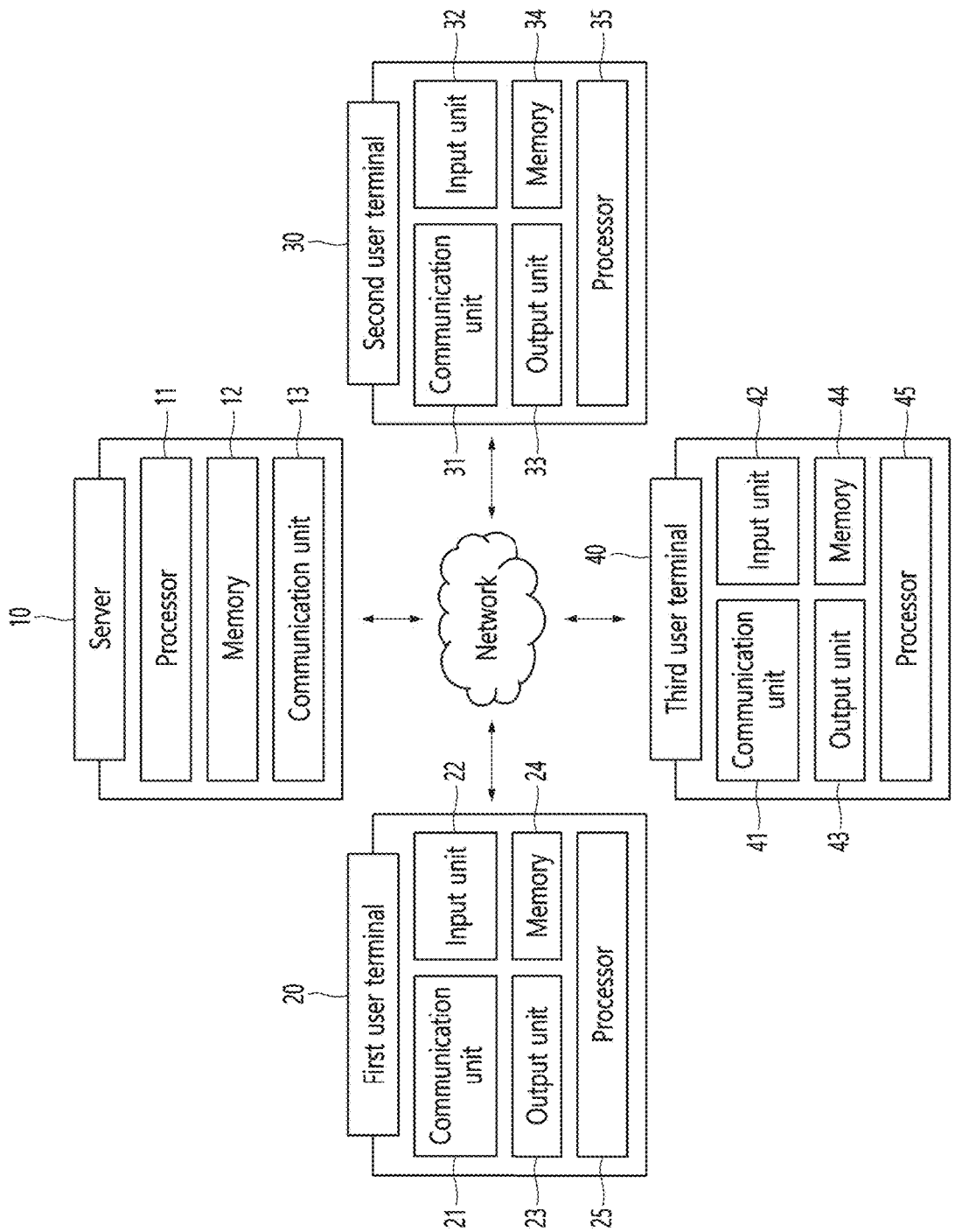
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10, a first user terminal 20, a second user terminal 30, and a third user terminal 40.

The server 10 is a device that provides a messenger service to a user terminal. A user terminal exemplified as the first user terminal 20, the second user terminal 30, and the third user terminal 40 is devices using the messenger service provided by the server 10. The server 10 and the user terminal may perform at least one operation associated with creation, participation, exit, and message transmission of a group chat room by transmitting or receiving a signal or data via a network. The user terminal may be referred to differently depending on functions thereof.

For example, the first user terminal 20 is an apparatus that acquires invitation information for a group chat room from the server 10 and determines whether or not to participate in the group chat room, the second user terminal 30 is an apparatus that provides the invitation information to the server 10 in order to invite a first user to the group chat room, and the third user terminal 40 may be an apparatus of another user (e.g., a third user) who has already participated in the group chat room. Hereinafter, the first user terminal 20 may be referred to as a participant terminal, the second user terminal 30 as an inviter terminal, and the third user terminal 40 as another participant terminal.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, contents, services, and the like. The server 10 may be a server 10 capable of transmitting and receiving information through communication with a user terminal via a network.

The server 10 may include a processor 11, a memory 12, and a communication unit 13.

The processor 11 may provide a messenger service to the user terminal by controlling overall operations of the memory 12 and the communication unit 13. The messenger service may be a service that allows a plurality of users to transmit or receive messages to or from each other through a platform provided by the server 10. Here, it may be understood that the message includes all transmittable data such as texts, photos, videos, voice files, and emoticons.

The memory 12 serves as a storage medium and may store a plurality of application programs running on the server 10, and data and instructions for operating the server 10. As an example, an application associated with a messenger service may be stored in the memory 12.

This memory 12 may be provided in the form of any of various hardware storage devices such as an ROM, an RAM, a flash drive, a hard drive, etc. or may be provided in the form of web storage.

The communication unit 13 may communicate with the user terminal via a network in a wired/wireless manner.

The server 10 of the present disclosure receives invitation information for inviting a first user to a group chat room from the second user terminal 30, provides the participant terminal with participant-related information of the group chat room, including the first user, based on the invitation information, provides the first user terminal 20 with invitation information, and provide the first user terminal 20 with a message created in the group chat room. Here, the participant terminal refers to a terminal of a participant participating in the group chat room other than the first user and the second user. In addition, when acquiring an exit response regarding the group chat room from the first user terminal 20, the server 10 of the present disclosure provides the participant terminal with update information on the participant-related information regarding the first user.

Here, the group chat room is a concept that is generally distinguished from a 1:1 chat room and My chat room, and refers to a chat room with three or more participants. However, in some cases, a chat room with two participants may also be considered the group chat room. The group chat room is a virtual space in which participants of the chat room are capable of exchanging messages, and may be implemented through a chat session opened by the server 10.

Here, the invitation information refers to information including an intention of the second user to invite the first user to the group chat room. Such invitation information may be transmitted from the second user terminal 30 to the server 10.

Here, the participant-related information may include information on a change in participants, such as addition or exclusion of a participant to or from a group chat room. Specifically, when there is a change in participants of the group chat room, the participant-related information may be information on a changed participant list or information on an update (addition or exclusion) of the participant subject to change. The participant list information refers to information on each user currently participating or determined to be participating in a group chat room, and is hereinafter referred to as a participant list. Specifically, not only a user currently participating in the group chat room, but also a user who has received invitation information to be described later and not yet decided whether or not to participate in the group chat room may be included in the above-described participant list. Such a participant list may be updated according to the participation or exit of a user.

The participant update information may be information indicating that a user should be updated (added or excluded) in the list in accordance with the user's participation or exit in or from the group chat room. Specifically, the participant update information refers to information used to apply a change occurring when the participant list of the group chat room changes due to the first user's leaving the group chat room. Specifically, the participant update information may be a control command requesting the user terminal to change the participant list by applying the first user's leaving or may be information on a participant list with the first user excluded.

The first user terminal 20 is a terminal device that receives invitation information from the server 10. The first user terminal 20 may include a communication unit 21, an input unit 22, an output unit 23, a memory 24, and a processor 25.

The communication unit 21 may communicate with the server 10 or other terminals in a wired/wireless manner.

The input unit 22 may receive any of various types of information through a user's operation and input behavior. Such an input unit may be a touch screen module, a keyboard, a mouse, a button, a camera, a stylus, and a microphone.

The first user terminal 20 may receive a user's interaction through the input unit 22. The interaction means that the user operates the input unit 22 to input information to which the user's selection or intention is applied to the first user terminal 20. For example, the interaction may be a touch on a touch screen, a click of a mouse, typing of a keyboard, a sound input to a microphone, an image capture by a camera, motion recognition by a motion sensor, and the like.

The output unit 23 may output any of various types of information. The output unit 23 may be a display device, a speaker, a vibration generating device, a tactile sensation generating device, and the like. In some cases, the output unit 23 may be a device (e.g., Bluetooth earphone) that is connected to a user terminal through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20.

This memory may be provided in the form of any of various hardware storage devices such as an ROM, an RAM, a flash drive, a hard drive, etc. or may be provided in the form of web storage.

In one embodiment, an application associated with a messenger service providing a group chat room function may be stored in the memory 24. Such an application may include information on other users registered as friends of the user in the messenger service.

The processor 25 may control overall operations of the communication unit 21, the input unit 22, the output unit 23, and the memory 24 to execute an application associated with the messenger service.

The first user terminal 20 of the present disclosure receives invitation information regarding the second user's inviting the first user to the group chat room from the server 10, displays chat room information on the group chat room, and when the second user is not registered as a friend of the first user in the messenger service, the first user terminal displays information on the second user and an interface for deciding whether to participate in the group chat room, acquires through the interface an interaction regarding a decision of whether to participate in the group chat room, and displays a message created in the group chat room.

Whether or not to activate the above-described operation of the first user terminal 20 may be determined by settings of the first user. Specifically, when the first user sets the above-described operation to be activated, displaying the interface, acquiring the interaction, and displaying the message may be performed depending on whether the second user is a friend of the first user. However, when the first user sets the above-described operation to be inactive, the first user participates in the group chat room regardless of whether the second user is a friend of the first user.

The second user terminal 30 is a terminal device that provides invitation information to the server 10 in order to invite the first user to a group chat room in the present disclosure. The second user terminal 30 is a terminal device identical to or similar to the first user terminal 20. The second user terminal 30 may include a communication unit 31, an input unit 32, an output unit 33, a memory 34, and a processor 35. The respective components included in the second user terminal 30 performs substantially the same functions as the components included in the first user terminal 20.

The second user terminal 30 may transmit invitation information or a message regarding a group chat room to the server 10. In addition, the second user terminal 30 may receive, from the server 10, participant update information of the group chat room and a message created by another user terminal.

The third user terminal 40 is a terminal device of a third user already participating in the group chat room in the present disclosure. The third user terminal 40 may include a communication unit 41, an input unit 42, an output unit 43, a memory 44, and a processor 45. The respective components included in the third user terminal 40 perform substantially the same functions as the components included in the first user terminal 20.

The third user terminal 40 may transmit a message to the server 10. In addition, the third user terminal 40 may receive a participant list of group chat room, participant update information of the group chat room, and a message created by another user terminal from the server 10.

Figure 2:
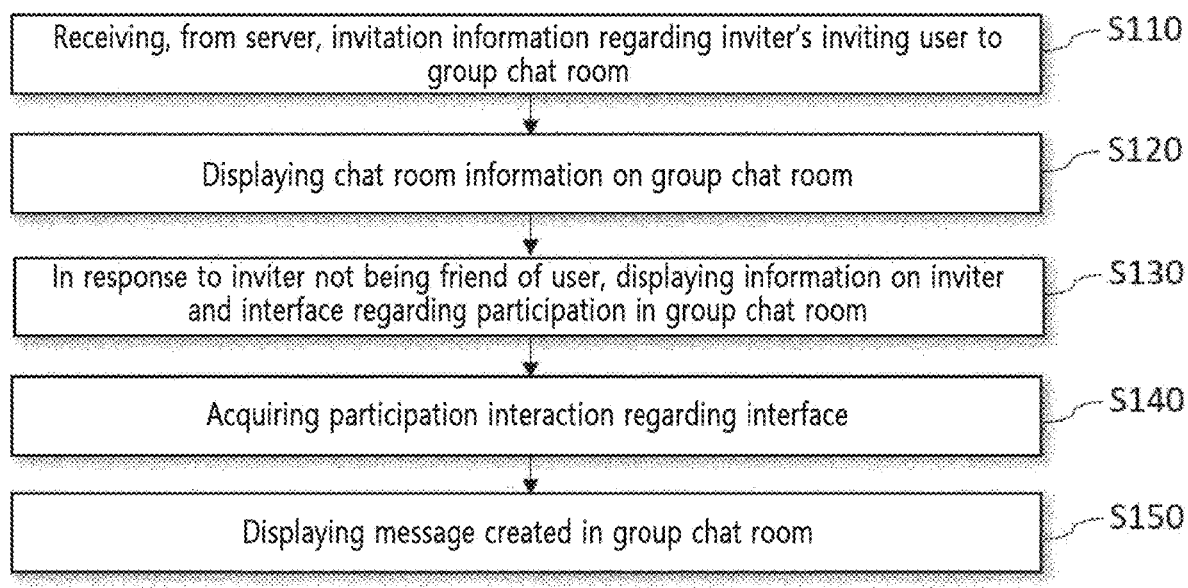
FIG. 2 is a flowchart illustrating operations of a first user terminal according to an embodiment of the present disclosure.

FIG. 2 is a flowchart illustrating operations of the first user terminal 20 according to an embodiment of the present disclosure.

In operation S110, the first user terminal 20 receives invitation information regarding the second user's inviting the first user to a group chat room from the server 10.

When the second user wishes to invite the first user to the group chat room, the second user terminal 30 may transmit invitation information including the intention to invite the first user to the server 10. The server 10 may transmit the invitation information to the first user terminal 20. Here, the second user may invite the first user while creating a new group chat room, or may additionally invite the first user to a group chat room that is already created.

The invitation information may include any of various types of information on the invitation. Specifically, at least one of the following may be included: a title (name) of the group chat room, identification information of an invited user (first user), identification information of an inviting user (second user), identification information of a user participating in the group chat room (third user), or a relationship between the invited user and the inviting user (whether or not they are friends).

In some cases, the invitation information received by the first user terminal 20 from the server 10 may not include the information on the relationship between the invited user and the inviting user. In this case, the first user terminal 20 may check the identification information of the invited user from the invitation information, and may determine the relationship with the invited user based on a friend list of the first user's messenger service.

In an operation to be described later, even before the first user terminal 20 determines whether to enter the group chat room to which the first user terminal 20 is invited, the server 10 may have the first user 20 participate in a chat session in response to the first user terminal 20 receiving invitation information from the second user terminal 30. Even before the first user terminal 20 determines whether to enter the group chat room, a message created in the group chat room may be transmitted to the first user terminal 20. This will be further explained below.

In operation S120, the first user terminal 20 displays chat room information on the group chat room.

The chat room information may be displayed distinguishable from other chat rooms in a chat room list. The chat room information may include any of various types of information on the group chat room. For example, the chat room information may include a name of the group chat room, information on participants in the group chat room, a number of participants in the group chat room, information indicating that the group chat room is created, an invitation reminder message for the group chat room, a last message in the group chat room, a time at which the last message is received in the group chat room, a number of unread messages created in the group chat room, etc.

The first user terminal 20 may acquire a user's interaction regarding the chat room information. When the interaction is detected, the first user terminal 20 may perform an operation associated with the group chat room. For example, the first user terminal 20 may enter the group chat room or display information associated with entering the group chat room in response to the interaction. The chat room information may occupy a predetermined area on the screen of the first user terminal 20. In this case, the interaction may be acquired through the predetermined area.

In operation S130, when the second user is not registered as a friend of the first user in the messenger service, the first user terminal 20 displays information on the second user and an interface for deciding whether to participate in the group chat room. This interface may be displayed in response to the above-described interaction regarding the chat room information.

Whether or not the first user terminal 20 performs operation S130 is determined depends on the relationship between the first user and the second user. More specifically, when the second user is a friend of the first user in the messenger service of the present disclosure, the displaying in operation S130 is performed.

The fact that the second user is a friend of the first user may mean a case where the first user has registered the second user as a friend in the messenger service. When the second user has registered the first user as a friend whereas the first user has not registered the second user as a friend, the second user may not be a friend of the first user.

The determination as to whether the second user is a friend of the first user may be performed by the first user terminal 20. Specifically, the first user terminal 20 may determine whether the second user is a friend of the first user based on information on a friend list in the messenger service, the information stored in the first user terminal 20.

In another example, the determination as to whether the second user is a friend of the first user may be performed by the server 10. The first user terminal 20 may receive information on whether the second user is a friend of the first user from the server 10, and then determine whether to perform operation S130 based on the received information.

When the second user is not a friend of the first user, the first user terminal 20 may display information on the second user and an interface for deciding whether to participation in the group chat room (hereinafter, referred to as "participation deciding interface").

The information on the second user may be identification information for identifying the second user. For example, the information on the second user may include a profile picture registered in the messenger service by the second user, a name (e.g., nickname and ID), a status message, and the like. Accordingly, the first user may infer the identity of the second user through the information on the second user. In addition, information indicating that the second user is not a friend of the first user may also be displayed.

The participation deciding interface may provide an interface to acquire from the first user an input of whether or not to participate in the group chat room. For example, the interface may provide an area for selecting "Participate" or "Leave" the group chat room.

In operation S140, the first user terminal 20 acquires through the interface an interaction regarding a decision of whether to participate in the group chat room.

Through the participation deciding interface in the first user terminal 20, the first user may input an interaction regarding a decision of whether to participate in the group chat (hereinafter, referred to as "participation interaction") or an interaction regarding a decision to exit the group chat room (hereinafter, referred to as "exit interaction"). Specifically, the first user may input a participation interaction by touching an area marked "Participate" in the participation deciding interface, or may input an exit interaction by touching an area marked "Leave".

In operation S150, the first user terminal 20 displays a message created in the group chat room.

Here, the message may be a message created by a participant of the group chat room after the first user terminal 20 receives the invitation information. More specifically, the message may be a message created until the first user terminal 20 acquires an interaction regarding a decision of whether to participate in the group chat room through the interface after the first user terminal 20 receives the invitation information.

Accordingly, when acquiring an interaction regarding a decision of whether to participate in operation S140, the first user terminal 20 enters the group chat room. In addition, the first user terminal 20 may display, on the screen of the group chat room, all messages created after a time of invitation by the second user.

In one embodiment, the first user terminal 20 may receive the message of operation S150 through the server 10 in real time upon occurrence of the message, and may display the message in response to acquiring a participation interaction. Accordingly, in this case, when the first user terminal 20 acquires an exit interaction, the message received by the first user terminal 20 may not be displayed but deleted.

In another embodiment, the first user terminal 20 requests a message from the server 10 in response to acquiring a participation interaction, and then receive the message of operation S150 from the server 10 and display the message. In yet another embodiment, the first user terminal 20 may acquire the message of operation S150 in real time through the server 10, transmit participation decision information to the server 10 in response to acquiring a participation interaction, and display a message in response to acquiring a response from the server 10, the response indicating that it is allowed to display a message. In yet another embodiment, the first user terminal 20 may acquire the message of operation S150 in real time through the server 10, and display a message created in the group chat room after acquiring the participation interaction. Hereinafter, with reference to FIGS. 3 to 8, specific exemplary screens of a method for using a messenger service of a group chat room by a user terminal described above with respect to FIG. 2 will be described.

Figure 3:
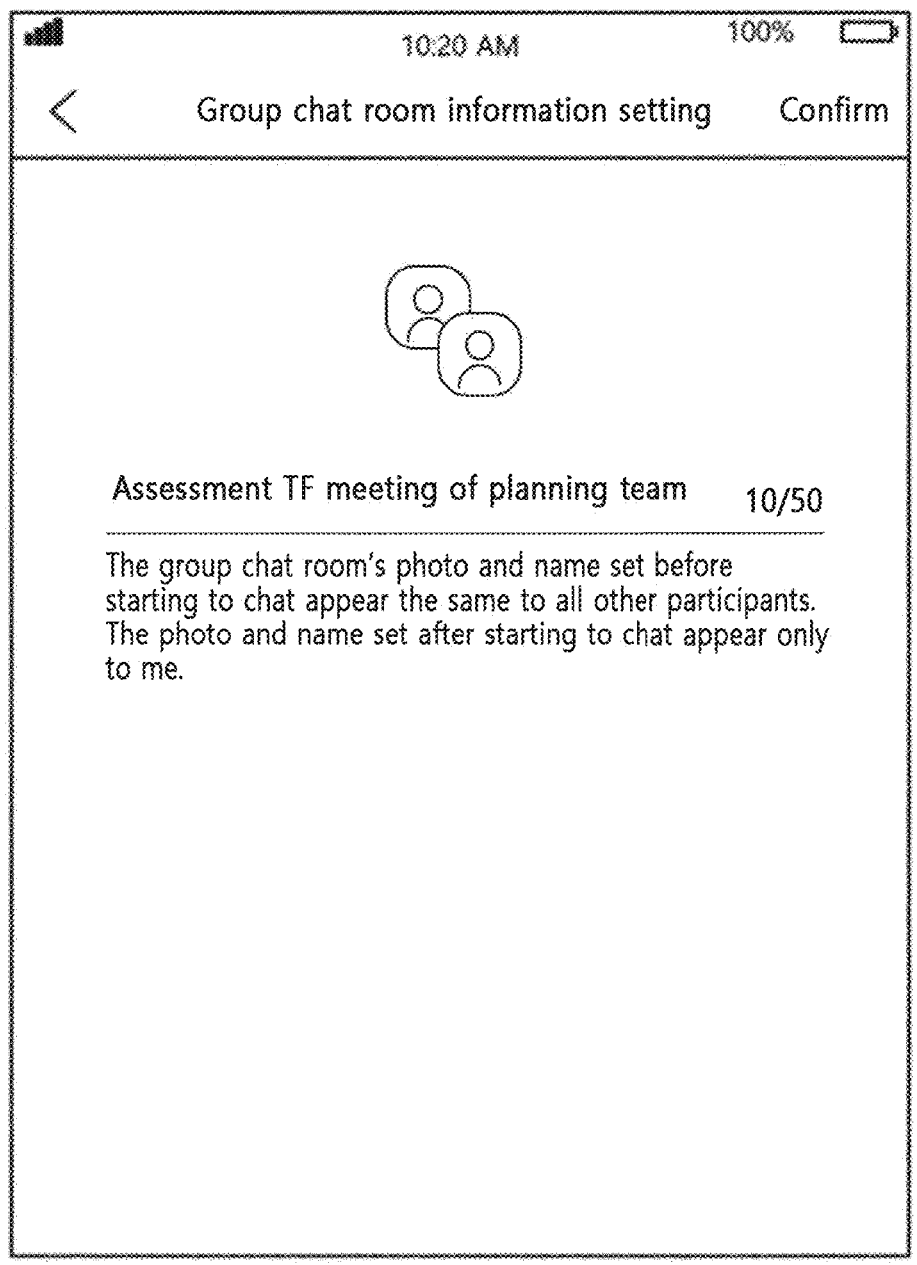
FIG. 3 illustrates an operation for an inviter terminal to create a group chat room according to an embodiment of the present disclosure.

FIG. 3 illustrates an operation for the second user terminal 30 to create a group chat room according to an embodiment of the present disclosure.

Referring to FIG. 3, the second user terminal 30 may create a group chat room including the first user terminal 20 and the third user terminal 40. The second user terminal 30 may select a first user and a third user as participants in a group chat room in order to create the group chat room, and may request the server 10 to create a group chat room.

Information on a request to create a group chat room may be included in invitation information for the group chat room transmitted to the server 10. Also, the invitation information may further include any of various types of information on the group chat room. That is, the invitation information may include information indicating that the first user intends to create the group chat room and that the first user and the third user are included as participants (e.g., a participant list).

Thereafter, the server 10 may transmit the acquired invitation information to the first user terminal 20. The above-described operation S110 in FIG. 2 may be performed in response to the transmission of the invitation information.

In some cases, in addition to the invitation information received from the second user terminal 30, the server 10 may further transmit 10 to the first user terminal 20 information generated based on a determination (whether or not the second user is a friend of the first user) by the server 10.

FIG. 3 is an embodiment in which the second user terminal 30 creates a group chat room, and the second user terminal 30 may transmit invitation information for the first user to the server as the group chat room is created. In some cases, an operation of inviting the first user terminal 20 in a state in which the second user terminal 30 has already participated in a created group chat room may also be performed through the above-described operation of transmitting invitation information.

Figure 4:
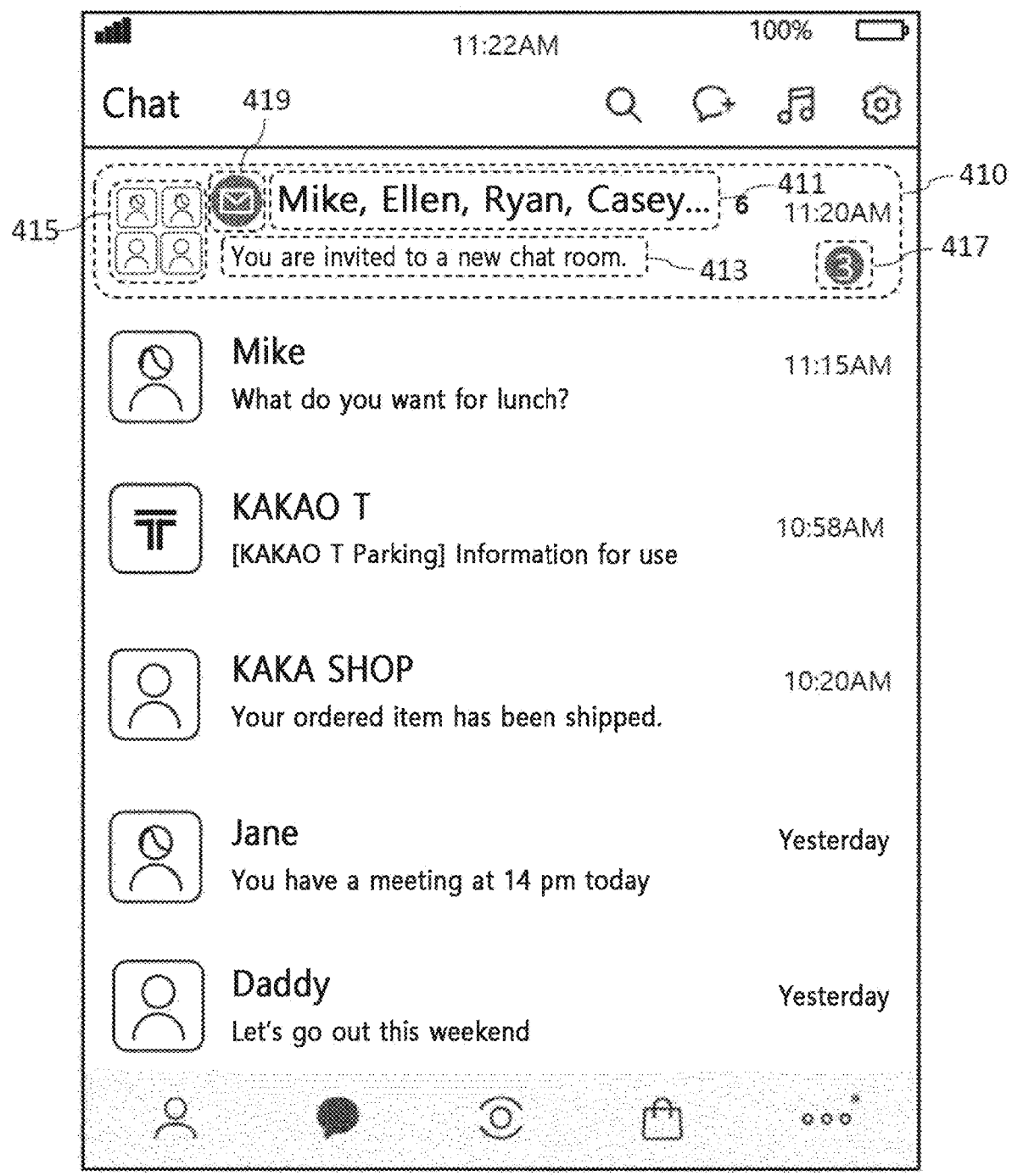
FIG. 4 illustrates an exemplary screen of chat room information 410 that a first user terminal displays upon receipt of invitation information according to an embodiment of the present disclosure.

FIG. 4 illustrates a screen displayed on the first user terminal 20 as the above-described operation S120 in FIG. 2 is performed. Specifically, FIG. 4 illustrates a screen of chat room information 410 displayed by the first user terminal 20 upon receipt of invitation information.

Referring to FIG. 4, the first user terminal 20 may display different chat room information 410 depending on whether the second user is registered as a friend of the first user in the messenger service.

The chat room information 410 may include at least one object associated with a group chat room. Here, at least one object may be displayed in an area allocated according to properties thereof. For example, in the chat room information 410, names of participants in the group chat room may be displayed in a first area 411, messages associated with the group chat room may be displayed in a second area 413, profile images of the participants in the group chat room may be displayed in a third area 415, and the number of unread messages in the group chat room may be displayed in a fourth area 417.

The chat room information 410 may further include a fifth area 419 for displaying an invitation indicator. The invitation indicator may correspond to an icon displayed in the fifth area 419.

The invitation indicator may be an indicator included in the chat room information corresponding to the group chat room when the first user is invited to the group chat room by a user who is not registered as a friend of the first user in the messenger service. In this case, by identifying the icon corresponding to the invitation indicator, the first user may ascertain that the user is invited to the group chat room by a non-friend user. For example, the invitation indicator may correspond to an envelope-shaped icon.

In addition, when the second user is not registered as a friend of the first user in the messenger service, an invitation notification message indicating occurrence of an invitation event, rather than the last message created in the chat room, may be displayed in the second area 413 for displaying a message associated with the group chat room. Therefore, in this case, through the chat room information 410, the first user may be aware of that the first user in invited to the group chat room by a user who is not a friend, but may not be aware of what kind of conversation takes place in the group chat room.

Figure 5:
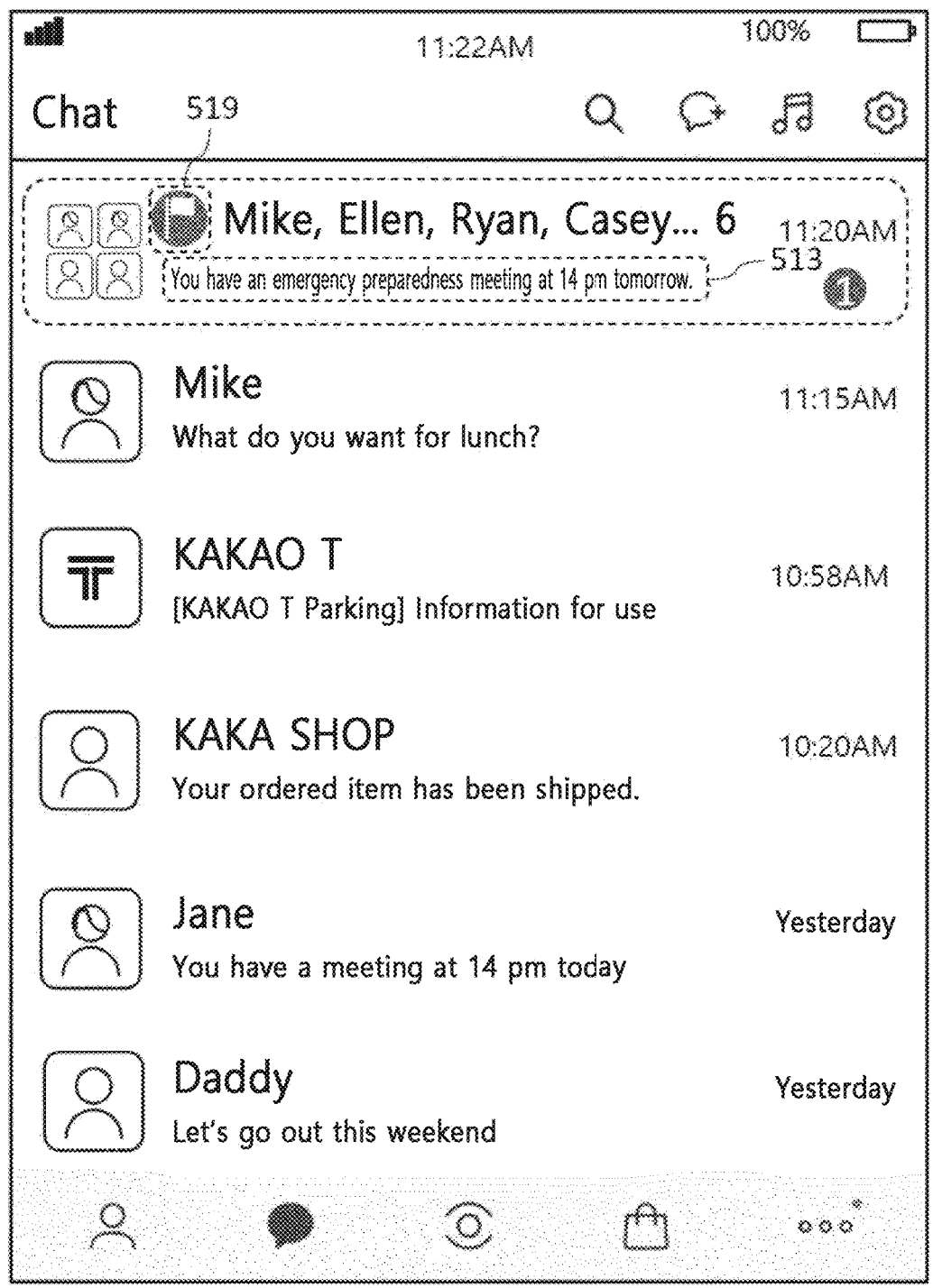
FIG. 5 illustrates an exemplary screen of chat room information that a first user terminal displays upon receipt of invitation information according to an embodiment of the present disclosure.

FIG. 5 illustrates an exemplary screen of chat room information displayed in response to the first user terminal 20 receiving invitation information according to an embodiment of the present disclosure.

The screen of FIG. 5 includes chat room information displayed when the second user of the first user terminal 20 is registered as a friend of the first user in a messenger service.

In the screen of FIG. 5 compared to the screen of FIG. 4, when the second user is registered as a friend of the first user in the messenger service, the last message created in a corresponding group chat room may be displayed in a second area 513 for displaying a message associated with the group chat room. In addition, an invitation indicator is not displayed in a fifth region 519, and other indicators associated with properties of the group chat room may be displayed, if any.

The screen of FIG. 5 may be a screen for displaying a chat room list again after the first user terminal 20 enters the group chat room in response to a participation interaction to the screen of FIG. 4.

After the entrance into the group chat room on the screen of FIG. 4, the invitation indicator displayed in the fifth region 419 of FIG. 4 may be deleted. Then, if there is another indicator of the group chat room, the indicator may be changed and displayed. However, if there are no other indicator of the group chat room, no indicator may be displayed.

Also, the invitation notification message displayed in the second area 413 of FIG. 4 may be changed to the last message created in the corresponding group chat room and displayed as shown in the second area 513 of FIG. 5.

Figure 6:
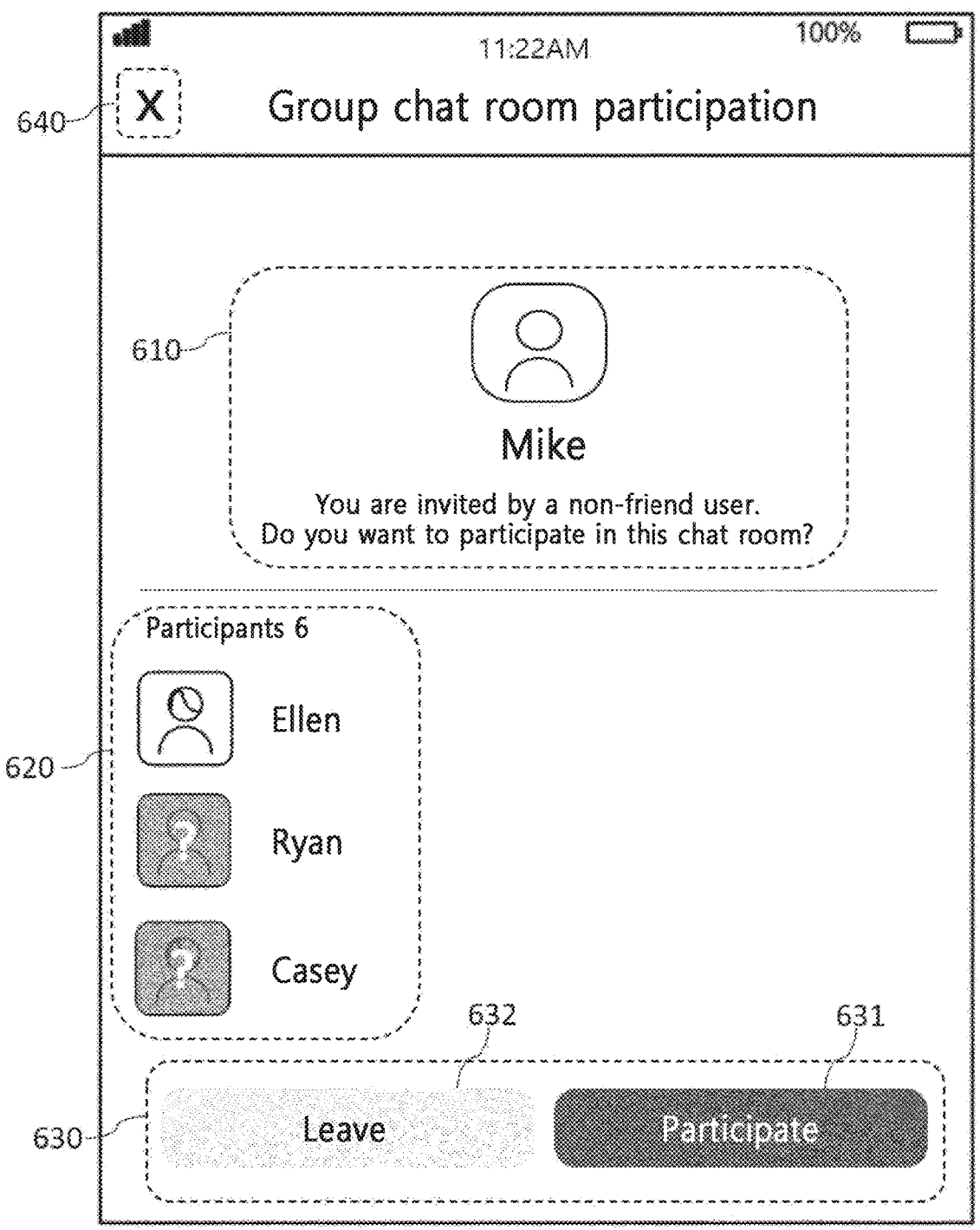
FIG. 6 illustrates another exemplary screen displayed by a participant terminal in response to an interaction to the screen of FIG. 5 according to an embodiment of the present disclosure.

FIG. 6 illustrates a screen displayed on the first user terminal 20 as the above-described operation S130 in FIG. 2 is performed. Specifically, FIG. 6 illustrates an exemplary screen on which the first user terminal 20 displays information on an inviter and an interface associated with participation in a group chat room. FIG. 6 may be displayed as the first user terminal 20 acquires an interaction regarding the chat room information 410 of FIG. 4.

Referring to FIG. 6, the first user terminal 20 may display a participation deciding screen for deciding whether to participate in the corresponding group chat room in response to an invitation from a second user.

The participation deciding screen may be divided into a first area 610 for displaying information on the second user, a second area 620 for displaying other participants already participating in the group chat room, and a third area 630 for displaying an interface for deciding whether to participate in the corresponding group chat room.

As will be described later, since the first user is already participating in the corresponding group chat room from the perspectives of the server 10, the second user terminal 30, and the third user terminal 40, "deciding whether to participate" may be similar to the first user's deciding whether to "enter" the corresponding group chat room and see messages.

The second user information displayed on the first area 610 may be information necessary for identifying the second user. For example, the second user information may be profile information set by the second user. The profile information may include a profile image (e.g., a photo and a picture) or a profile name (e.g., a name, a nickname, and ID) set by the user. Therefore, the first user may use the information displayed on the first area 610 to determine whether the second user is not registered as a friend of the first user in the messenger service but already known to the second user and then determine whether to participate in the group chat room.

The information on other participants displayed on the second area 620 may be identification information of the other participants (e.g., a third user) participating in the corresponding group chat room. For example, the information on other participants may be profile information of a third user, including a profile photo or profile name set by the third user. Therefore, the first user may determine properties of the group chat room based on the information displayed on the second area 620, and decide whether or not to participate in the group chat room based on the determined properties. For example, in a case where the other participants displayed on the second area 620 are colleagues at the workplace of the first user, even though the second user is not a user registered as a friend of the first user in the messenger service, it may be recognized that the chat room is related to work, and accordingly, the first user may decide to participate in the group chat room.

In addition, the first user terminal 20 may differently display other participants, displayed in the second area 620, according to a predetermined criterion. The predetermined criterion may depend on a relationship with the first user. For example, the predetermined criterion may depend on whether any of other participants is registered as a friend of the first user in the messenger service or whether there is a recent contact record with the first user.

The interface displayed on the third area 630 may provide an area for querying whether to enter or exit the group chat room from the first user. Specifically, a participate interface 631 or a leave interface 632 may be displayed on the third area 630.

The first user may decide whether or not to participate in the group chat room based on information acquired from the first area 610 or the second area 620, and provide, through an interface, an interaction regarding a decision of whether or not to participate in the group chat room.

If the first user does not want to make any decision on whether or not to participate in the group chat room, the first user may suspend the decision. In this case, the first user may end the participation deciding screen of the first user terminal 20. That is, the first user may end the participation deciding screen by providing the first user terminal 20 with an interaction 640 for ending the participation deciding screen.

Figure 7:
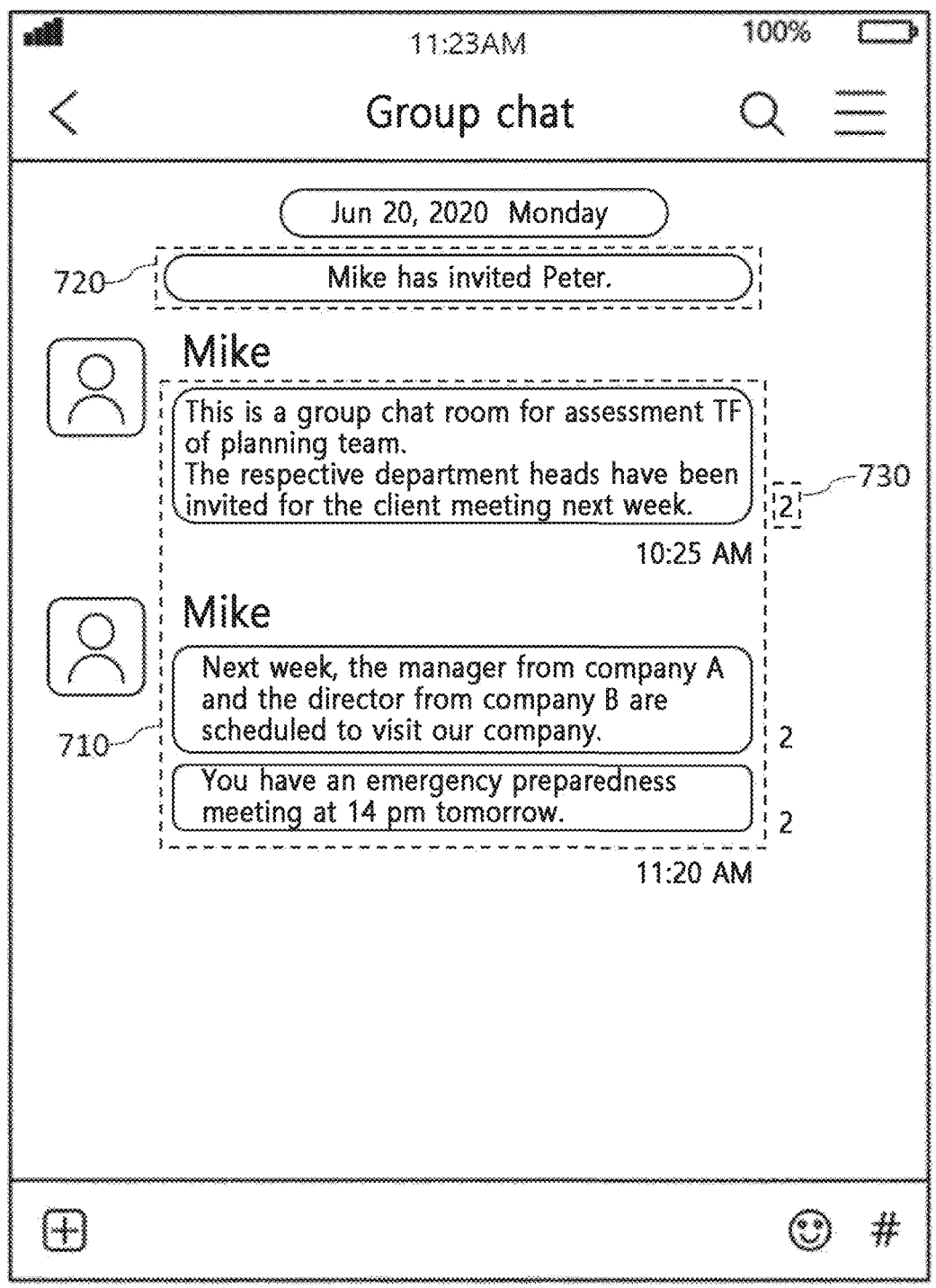
FIG. 7 illustrates an exemplary screen displayed on a first user terminal in response to an interaction acquired by the first user terminal according to an embodiment of the present disclosure.

FIG. 7 illustrates a screen displayed on the first user terminal 20 as the above-described operation S150 in FIG. 2 is performed. Specifically, FIG. 7 illustrates a screen on which the first user terminal 20 displays messages created in the group chat room. FIG. 7 may be displayed when the first user terminal 20 acquires an interaction to the participate interface 631 of FIG. 6.

Referring to FIG. 7, messages 710 created by another participant may be displayed on a screen of the group chat room in the first user terminal 20 according to the first user's participation interaction.

The messages 710 created by another participant may be messages created after the first user is invited to the group chat room. More specifically, the messages 710 may be messages created by the second user terminal 30 or the third user terminal 40 after the first user terminal 20 receives the invitation information from the server 10 until the first user terminal 20 enters the group chat room.

In addition, the first user terminal 20 may display an invitation feed message 720 at a time when the first user terminal 20 receives the invitation information from the server 10. Thus, the invitation feed message 720 may be displayed prior to the messages 710.

For example, suppose that the first user (Peter) receives an invitation to a group chat room at 10:20 am and enters the group chat room at 11:23 am in response to the invitation. Then, three messages 710 created between 10:20 am and 11:23 am may be displayed on the first user terminal 20 even though the messages are created before the first user enters the chat room.

When the first user terminal 20 enters the group chat room, an unread indicator 730 indicating whether a corresponding message has been read may be changed.

Figure 8:
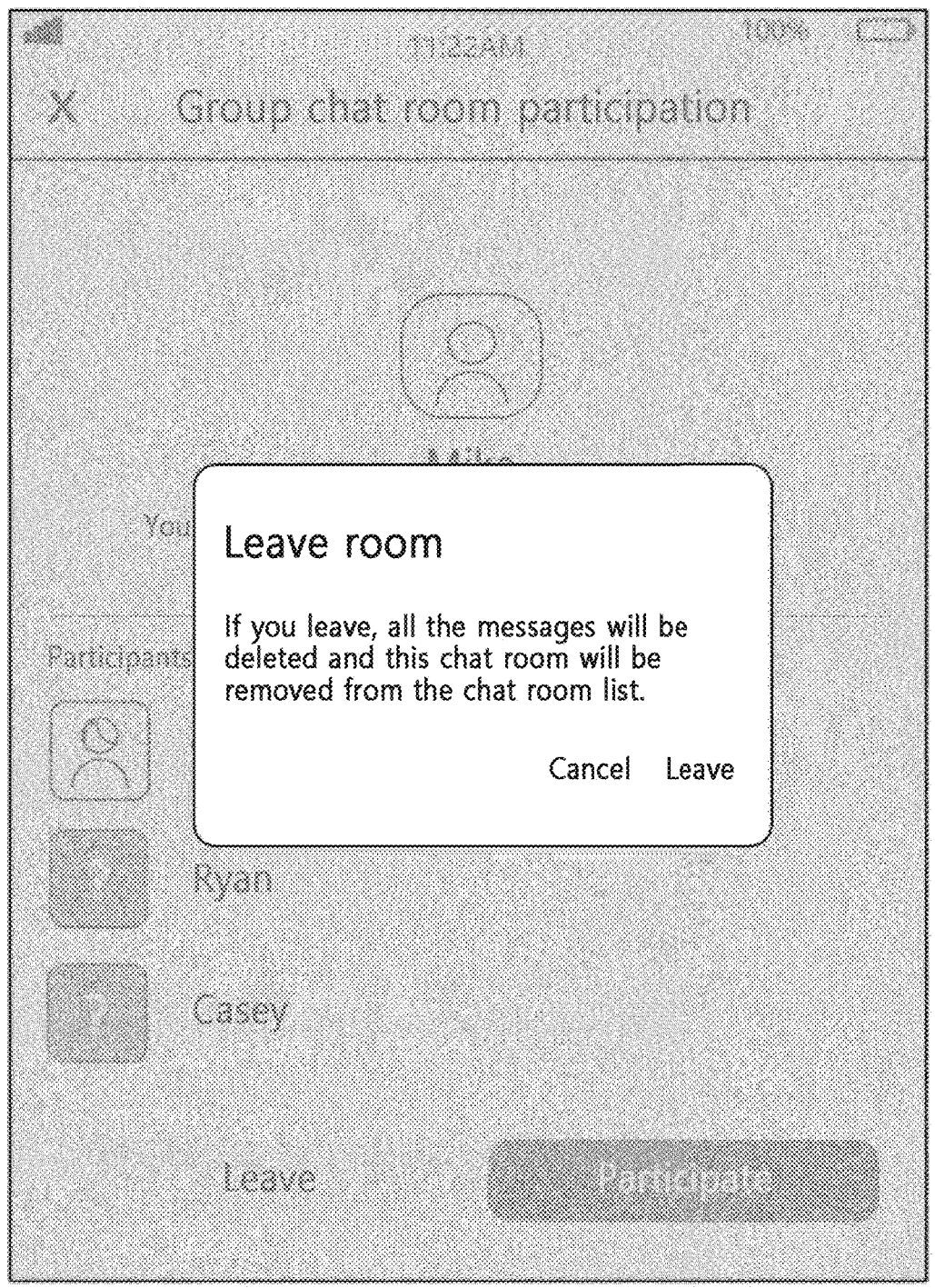
FIG. 8 illustrates an exemplary screen displayed on a first user terminal in response to an interaction acquired by the first user terminal according to an embodiment of the present disclosure.

FIG. 8 may be displayed when the first user terminal 20 acquires an interaction to the leave interface 632 of FIG. 6.

Referring to FIG. 8, in response to the first user's exit interaction, the first user terminal 20 may display a confirmation message of querying whether to exit the group chat room.

The messenger service used by the first user terminal 20 according to an embodiment of the present disclosure is a service for storing messages created in a group chat room even before the first user's entering the group chat room and displaying the messages on the first user terminal 20 in response to the first user's participation interaction.

When the first user terminal 20 acquires an exit interaction, the message created in the group chat room is deleted. Therefore, in order to prevent all messages from being deleted in response to an unintended input even before the first user checks the message, it is possible to query whether to exit the group chat room, and in response to acquiring a secondary exit interaction, delete the group chat room.

Figure 9:
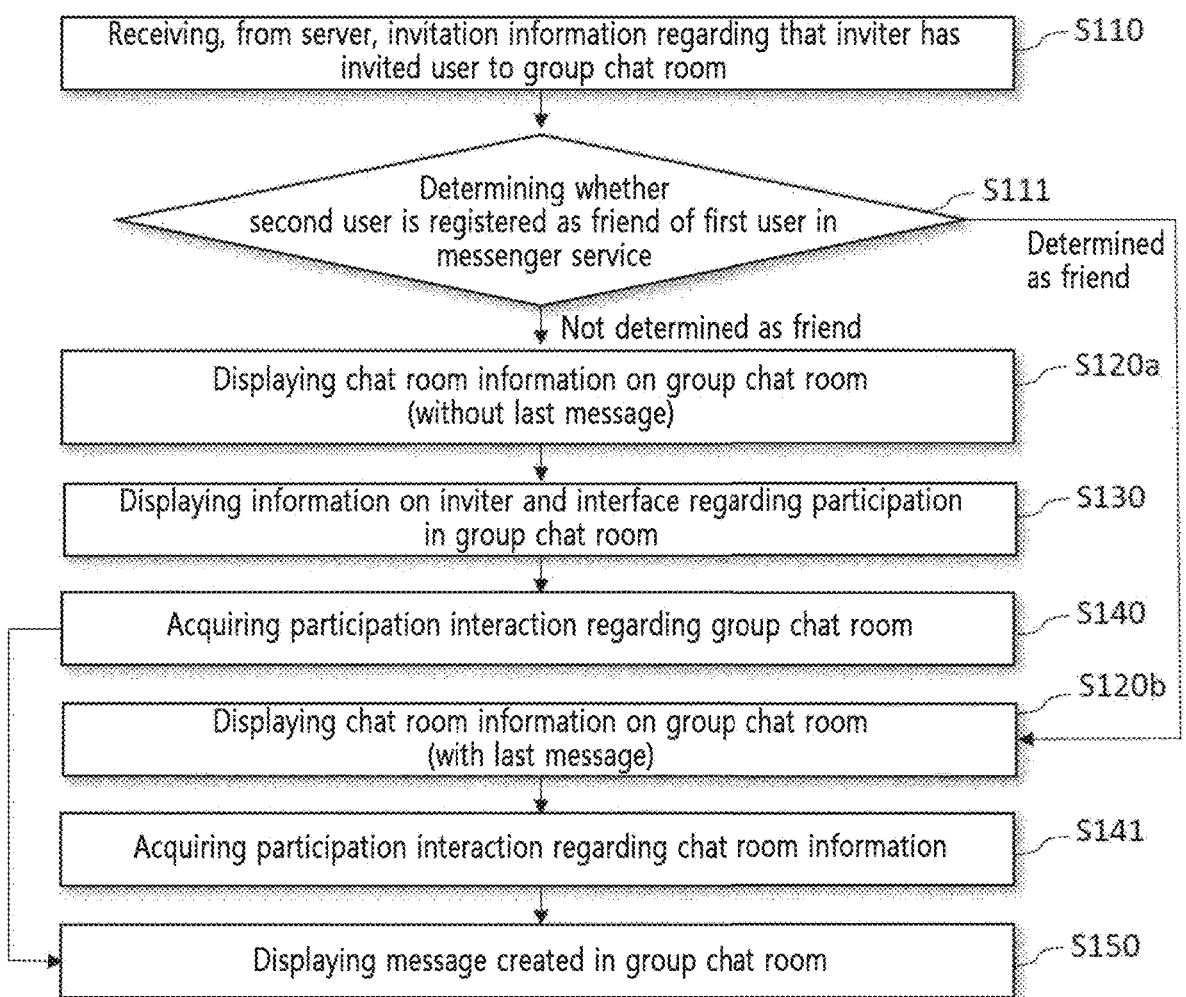
FIG. 9 is another flowchart illustrating an operation of a first user terminal according to an embodiment of the present disclosure.

FIG. 9 is another flowchart illustrating operations of the first user terminal 20 according to an embodiment of the present disclosure. Referring to FIG. 9, the first user terminal 20 may determine whether the second user is registered as a friend of the first user in a messenger service.

In operation S111, the first user terminal 20 determines whether the second user is registered as a friend of the first user in the messenger service.

The first user terminal 20 compares a friend list of the first user, stored therein, with information on the second user, which is included in invitation information, to determine whether the second user is a friend of the first user. In another example, the friend list to be compared with the invitation information may include not only a friend list associated with the messenger service, but also information on a user's contact information, call or text message history, and the like.

When the second user is not a friend of the first user, the first user terminal 20 may perform operation S120a, and when the second user is a friend of the first user, the first user terminal 20 may perform operation S120b.

In operation S120a, the first user terminal 20 displays chat room information on the group chat room.

The above-described operation may be similar to operation S120. However, the chat room information includes an invitation indicator displayed on the fifth area 419 (see FIG. 4), and a message associated with the group chat room and displayed on the second area 413 (see FIG. 4) may be an invitation notification message indicating invitation to the group chat room. In this case, the last message created in the group chat room may not be displayed on the second area. That is, the first user terminal 20 may include an invitation indicator and an invitation notification message, but not the last message, in the chat room information depending on whether the second user is a friend of the first user.

In operation S130, the first user terminal 20 displays information on an inviter and an interface associated with participation in the group chat room. The above-described operation may be the same as operation S130 of FIG. 2.

In operation S140, the first user terminal 20 acquires a participation interaction to the interface. The above-described operation may be the same as operation S140 of FIG. 2.

In operation S120b, the first user terminal 20 displays chat room information on the group chat room.

The above-described operation may be similar to operation S120. However, the chat room information does not include the invitation indicator displayed in the fifth area 419 (see FIG. 4), and a message associated with the group chat room and displayed in the second area 413 (see FIG. 4) may be the last message created in the group chat room.

In operation S141, the first user terminal 20 acquires a participation interaction regarding the chat room information.

The participation interaction may be any of various types of input provided by the first user to enter the group chat room. For example, it may be a touch input to a display area where the chat room information is displayed in the first user terminal 20, or may be a key input through an input device operatively coupled to the first user terminal 20.

In operation S150, the first user terminal 20 displays a message created in the group chat room. The above-described operation may be the same as operation S150 of FIG. 2.

Figure 10:
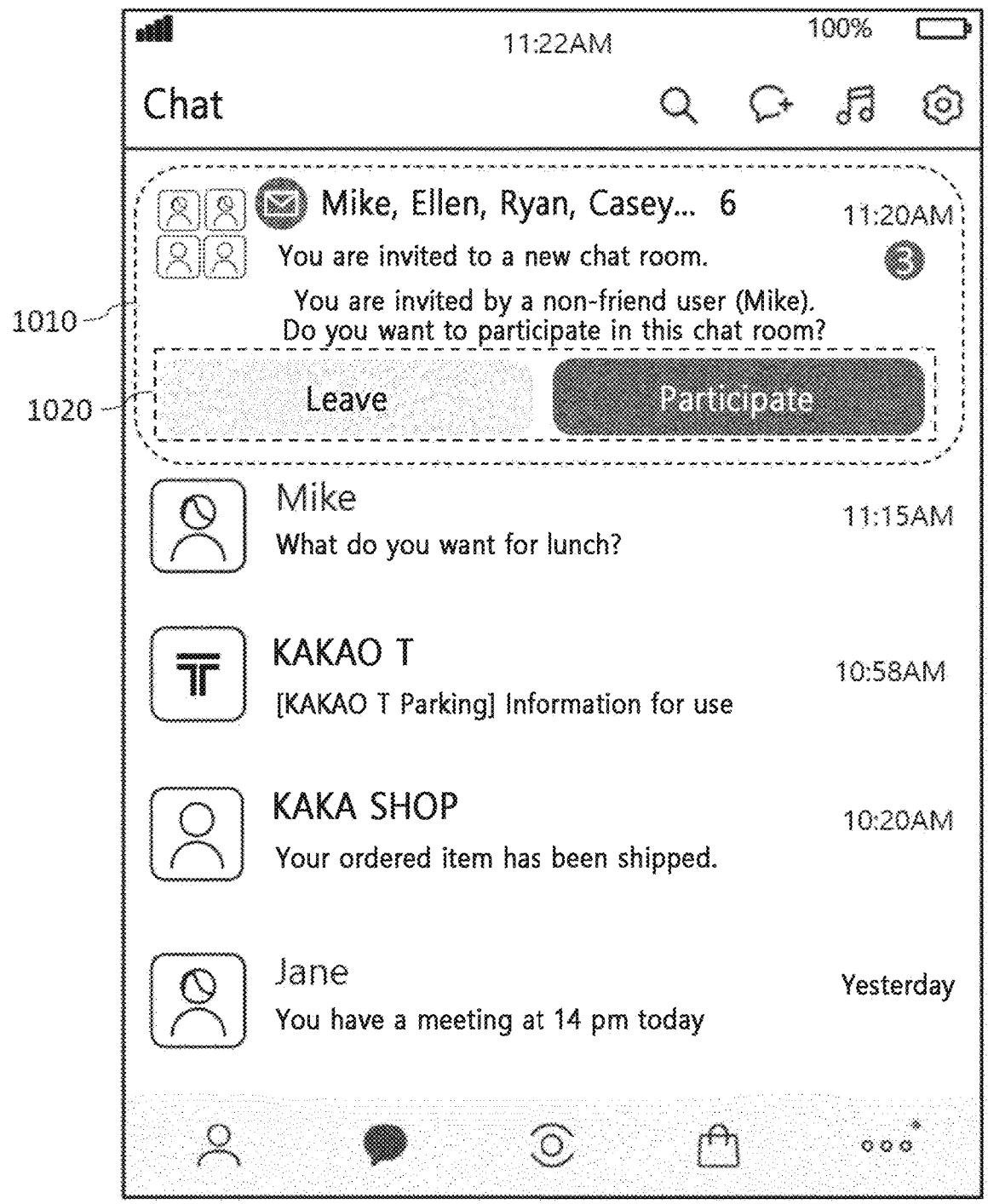
FIG. 10 illustrates an exemplary screen on which a first user terminal displays chat room information according to another embodiment of the present disclosure.

FIG. 10 illustrates a screen on which the first user terminal 20 displays chat room information according to another embodiment of the present disclosure.

Referring to FIG. 10, chat room information 1010 of the first user terminal 20 may include an interface 1020 included in the participation deciding screen in FIG. 6. In this case, the first user terminal 20 may acquire a participation interaction or an exit interaction from the first user, without displaying a separate participation deciding screen in the chat room information.

When the first user provides the participation interaction, the first user terminal 20 enters the group chat room and displays a created message, and when the first user provides an exit interaction, the first user terminal 20 may delete the chat room information.

The chat room information according to FIG. 10 may include information on the second user so that the first user can determine whether to participate in the corresponding group chat room. The information on the second user displayed at this case may be the same as or similar to that of FIG. 6.

Figure 11:
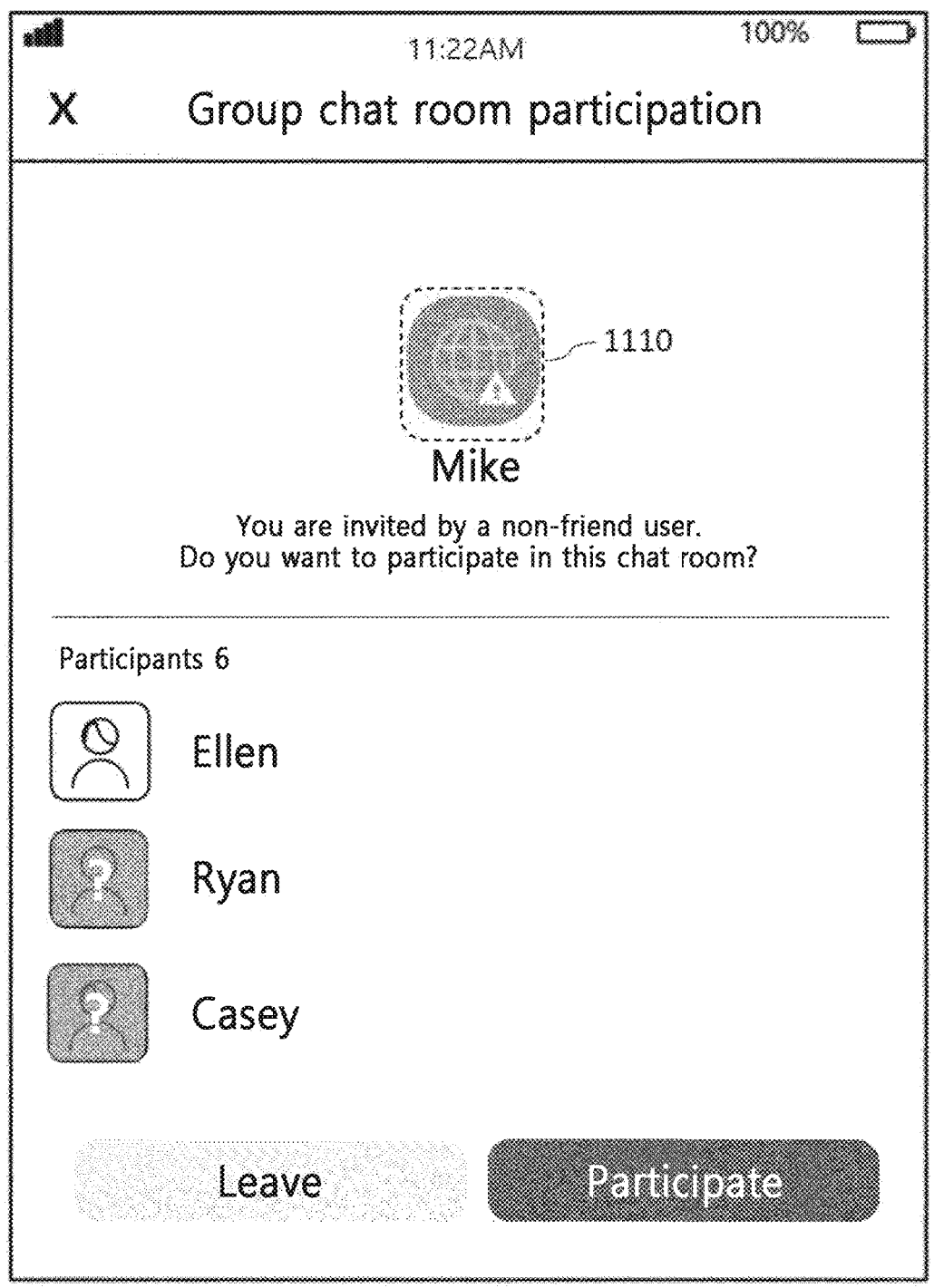
FIG. 11 illustrates an exemplary screen displayed when a first user terminal receives an invitation to a group chat room from an overseas user according to an embodiment of the present disclosure.

FIG. 11 illustrates a screen displayed when the first user terminal 20 receives an invitation to a group chat room from an overseas user according to an embodiment of the present disclosure.

When the second user who has sent invitation information for a group chat room to the first user is abroad, the first user may identify the second user's overseas residence through profile information of the first user, which is included in the first area of the participation decision screen.

For example, when location information of the second user terminal 30 that has sent the invitation information is overseas, or when identification information of the second user is overseas, the server 10 may transmit to the first user 20 information on whether the second user is an overseas user. In addition, the first user terminal 20 may change the profile information of the first user to an overseas user indicator 1110 on a participation deciding screen based on the information received from the server 10.

However, in this case, when the first user terminal 20 displays the participation deciding screen for the first time, normal profile information other than the overseas user indicator may be displayed in the first area 610 (see FIG. 6), and then, when the participation deciding screen is displayed again, the second user information included in the first area may be changed to the overseas user indicator. That is, after the first user terminal 20 receives information on whether the second user lives abroad from the server 10 while displaying the participation deciding screen, if the first user terminal 20 terminates the participation deciding screen and then displays the participation deciding screen again, the information on the second user may be updated by applying the information received from the server 10.

Figure 12:
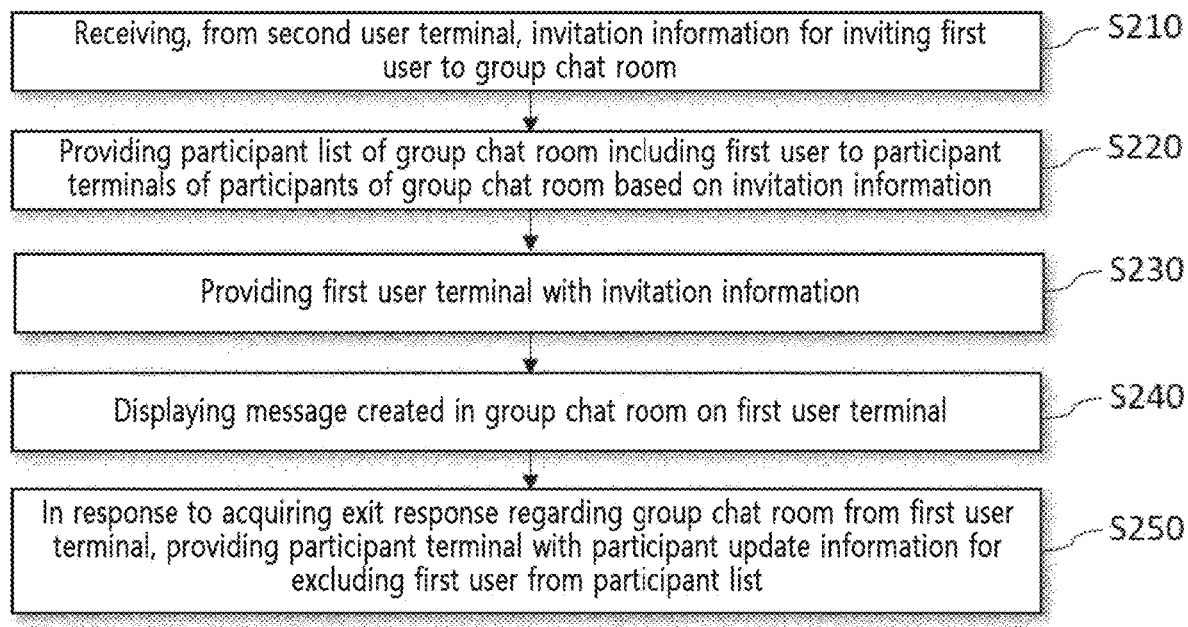
FIG. 12 is a flowchart illustrating operations of a server according to an embodiment of the present disclosure.

FIG. 12 is a flowchart illustrating operations of the server 10 according to an embodiment of the present disclosure.

In operation S210, the server 10 receives invitation information for inviting a first user to a group chat room from the second user terminal 30.

When the second user selects a user (e.g., the first user) to invite and then creates a group chat room or transmits an invitation request to the server 10, the server 10 may receive the invitation information. In this case, the invitation information includes information on the first user and the second user.

In operation S220, the server 10 provides a participant list of the group chat room, including the first user, to participant terminals of participants in the group chat room based on the invitation information.

The server 10 may provide the participant list of the group chat room to user terminals of the participants in the group chat room. Here, if the first user is invited to the group chat room, the first user is included in the participant list, regardless of whether the first user has entered the group chat room. The participant list may include information on all users who have already participated in the group chat room, including the first user who is to participates in the group chat room upon the invitation request from the second user. For example, profile information of a third user may be included in the participant list. The profile information of the third user may include at least one of a profile image and a profile name set by the third user.

When the third user receives the participant list, the third user may ascertain that the first user is included in the participant list displayed on the third user terminal 40, and may ascertain that the first user has been invited through a feed message displayed in the group chat room.

Apart from operation S220, the second user may share the same participant list with the third user. Since the second user has invited the first user, the second user may add the first user to the participant list even if the participant list is not provided from the server 10 in operation S220.

In operation S230, the server 10 provides the invitation information to the first user terminal 20. The above-described operation is an operation corresponding to operation S110.

In operation S240, the server 10 provides a message created in the group chat room to the first user terminal 20.

The server 10 may transmit the message created in the group chat room to the first user terminal 20, regardless of whether or not the first user has entered the group chat room. However, in this case, the first user terminal 20 may not display the transmitted message until the first user enters the group chat room. That is, the message created in the group chat room may be transmitted to the first user terminal 20 and displayed on a condition in which the first user terminal 20 acquires a participation interaction from the first user.

In operation S250, when the server 10 acquires an exit response regarding the group chat room from the first user terminal 20, participant update information for excluding the first user from the participant list is provided to the participant terminals.

When the first user terminal 20 acquires an exit interaction regarding the group chat room from the first user, the first user terminal 20 may delete the chat room information displayed on the screen of the first user terminal 20 and provide the server with information indicating that the first user has exit the corresponding chat room as a response to exit. In this case, the server 10 may recognize the exit of the first user from the group chat room based on the exit response, exclude the first user from the participant list of group chat room, and then provide an updated participant list to the user terminals of the participants. In some cases, the server 10 may provide the participant terminals with information indicating that the first user should be excluded from the participant list, rather than the participant list itself.

FIG. 12 describes an embodiment in which the first user terminal 20 determines whether the second user is a friend of the first user in a messenger service: however, this is merely an example and does not exclude an operation of determining a friendship between the first user and the second user based on information stored in the server and providing a control command to display different chat room information or a different participation deciding screen accordingly.

Figure 13:
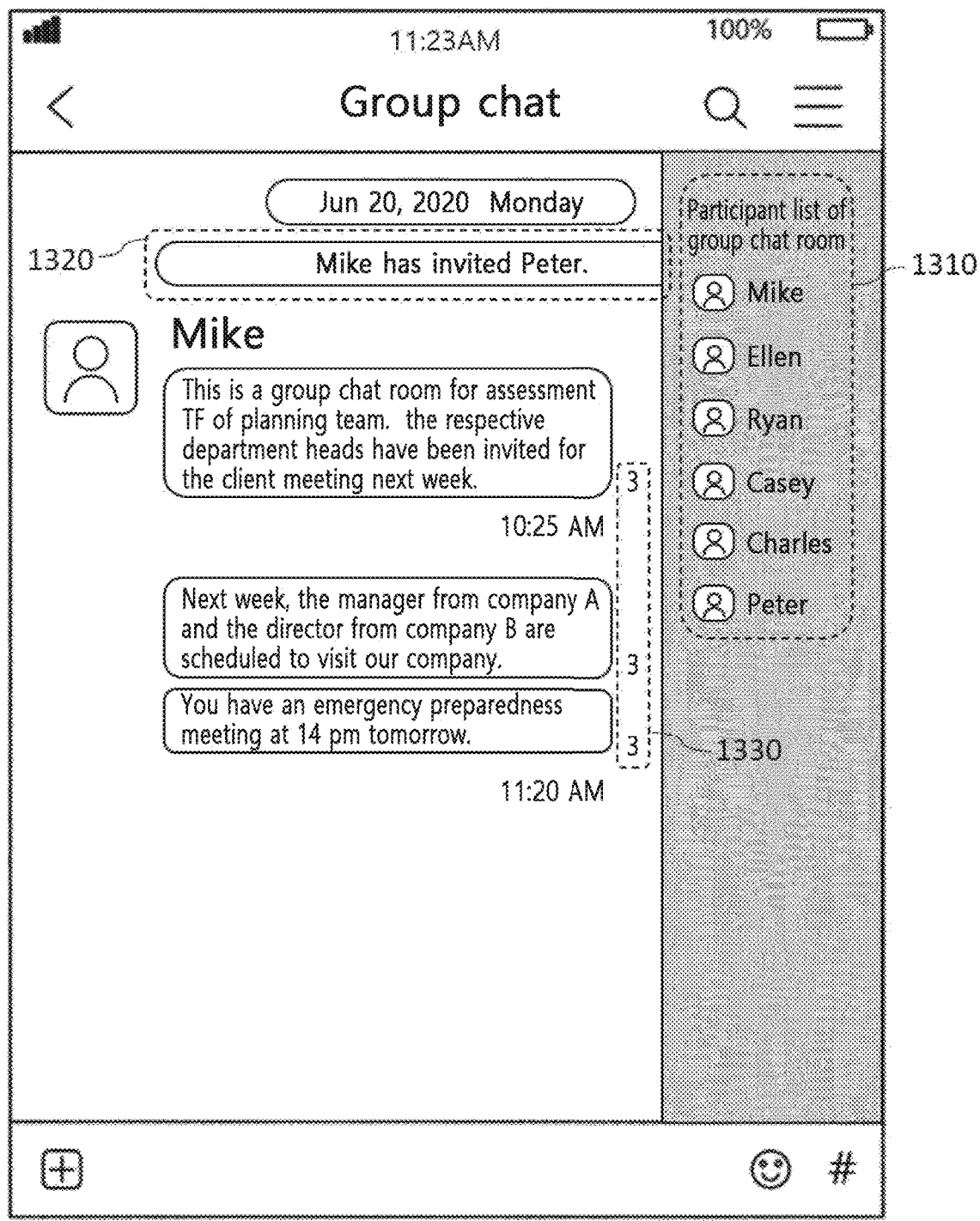
FIG. 13 illustrates an exemplary screen in which a third user terminal confirms participants of a group chat room according to an embodiment of the present disclosure.

FIG. 13 illustrates a screen in which the third user terminal 40 confirms participants in a group chat room according to an embodiment of the present disclosure.

Referring to FIG. 13, the third user may ascertain the first user invited by the second user through a list 1310 of group chatting participants and a feed message 1320.

For example, when the second user invites "Peter" who is the first user, the third user terminal 40 may acquire and display a participant list including "Peter" from the server 10. In addition, the third user terminal 40 may display the feed message 1320 indicating that "Peter" is invited to the group chat room.

In this case, the third user is not able to ascertain information on whether a participation deciding interface is displayed on the first user terminal 20, whether the second user is a friend of "Peter", or whether the second user has entered the group chat room.

However, an unread indicator 1330 marked with "3" implies that three out of four participants except for the user himself/herself and "Mike" has not read a message from "Mike", and it may not be possible to determine whether the person who read the message is "Peter".

When invited to an unwanted group chat room, the first user may be able to ascertain identity information of an inviter and exit the group chat room without reading a message (which is in fact a rejection to the invitation), but the inviter or other participants are not able to know whether the first user has rejected the invitation or whether the first user has exited the room for some reasons once entering the chat room. Thus, in this case, the second user is not able to ascertain whether the first user has registered the second user as a friend.

Figure 14:
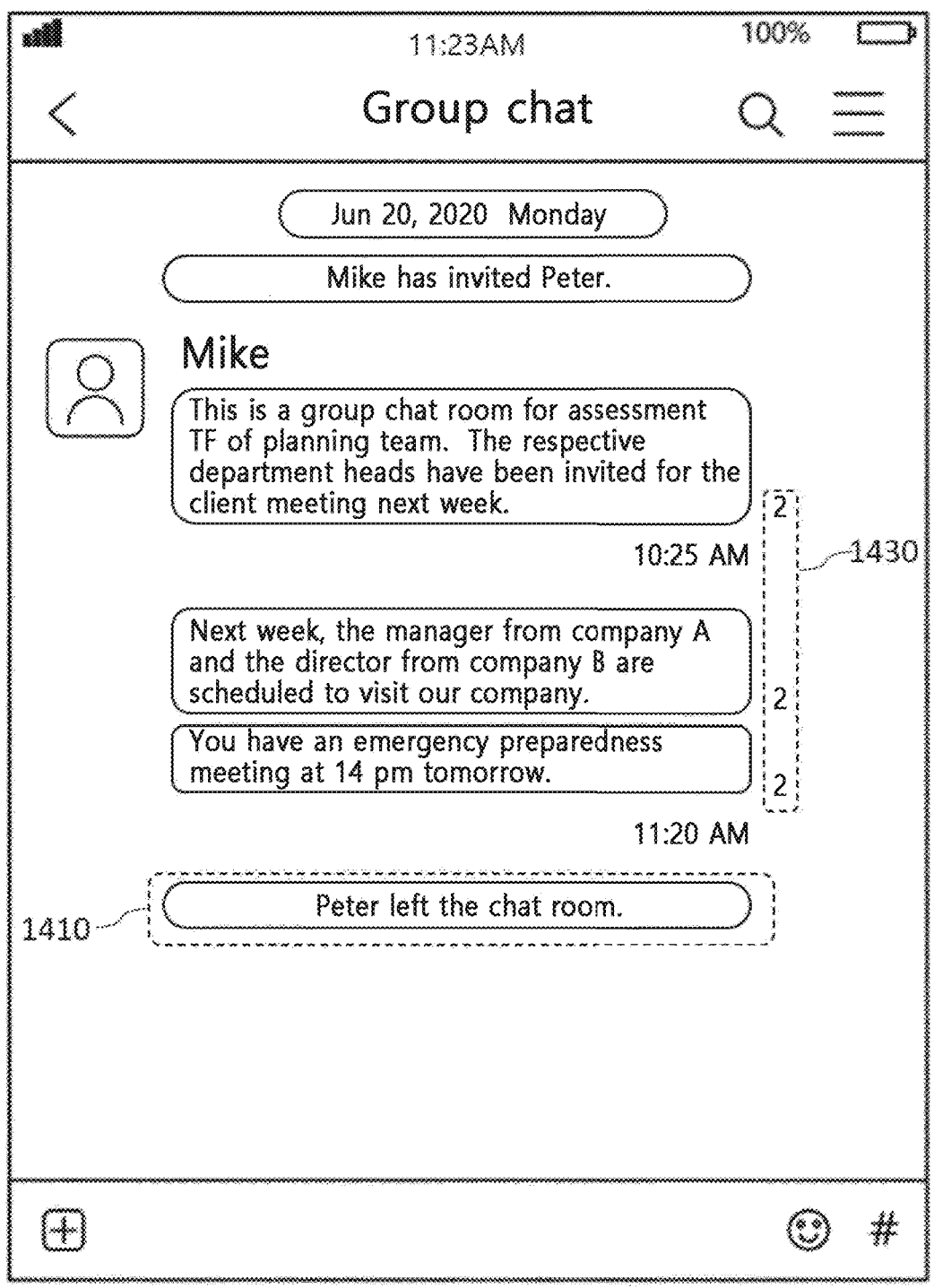
FIG. 14 illustrates an exemplary screen of a third user terminal when a first user exits a group chat room according to an embodiment of the present disclosure.

FIG. 14 illustrates a screen of the third user terminal 40 when the first user exits a group chat room according to an embodiment of the present disclosure.

Referring to FIG. 14, when "Peter", who is the first user, exits a group chat room, a feed message 1410 indicating that "Peter" has exit the group chat room may be displayed on a group chat room screen of the third user terminal 40.

In this case, compared to FIG. 13, it may be seen that an unread indicator 1430 decreases in value from 3 to 2 according to the exit of "Peter". In this case, for "Mike", who has invited "Peter", or the third user, it is not possible to know whether "Peter" enters the group chat room in response to the invitation and then exits after reading messages sent by "Mike" or whether "Peter" rejects the invitation without reading the messages.

In the apparatus and method for using a messenger service of a group chat room according to the present disclosure, it is possible to improve user convenience by undoing a user's participation in a group chat room, the participation which is against the user's intention.

The technical features disclosed in each embodiment of the present disclosure are not limited only to a corresponding embodiment, but the technical features in the respective embodiments may be combined and applied to different embodiments unless they are mutually incompatible.

Therefore, although each embodiment has been described mainly about a technical feature thereof, the technical features may be combined unless they are mutually incompatible.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A computer-implemented method for using a messenger service of a group chat room, the method comprising:
   receiving, by a first user terminal of a first user, from a server, invitation information associated with a second user's inviting the first user to the group chat room, each of the first user and the second user being registered in the messenger service;
   displaying, by the first user terminal, chat room information on the group chat room;
   storing, by the first user terminal, a friend list of the first user;

determining, by the first user terminal, that the second user is not registered as a friend of the first user in the messenger service by comparing the friend list of the first user with information regarding the second user;

displaying, by the first user terminal, i) the information regarding the second user registered in the messenger service, and an invitation notification message indicating occurrence of an invitation event without a most recent message created in the group chat room, on a first area of a screen of the first user terminal of the first user registered in the messenger service, and ii) an interface for deciding whether to participate in the group chat room on a second area of the screen of the first user terminal, the first area and the second area being different from each other and concurrently displayed on the screen;

acquiring, by the first user terminal, an interaction regarding a decision to participate in the group chat room through the interface; and in response to the interaction regarding the decision being acquired, displaying, by the first user terminal, a message created in the group chat room after reception of the invitation information.

2. The method of claim 1, wherein the message does not comprise a message created before reception of the invitation information by the first user terminal.

3. The method of claim 1, further comprising:
acquiring an interaction of selecting the group chat room, wherein the information regarding the second user and the interface are displayed in response to acquiring the interaction of selecting the group chat room.

4. The method of claim 3, further comprising:
in response to acquiring the interaction of selecting the group chat room, determining whether the second user is an overseas user,
wherein in response to the second user being the overseas user, the information regarding the second user comprises an overseas user indicator indicating that the second user is the overseas user.

5. The method of claim 1, wherein the chat room information comprises an invitation indicator indicating that the decision regarding whether to participate in the group chat room has not been made.

6. The method claim 5, wherein the invitation indicator is changed depending on properties of the group chat room in response to acquiring the interaction regarding the decision to participate in the group chat room through the interface.

7. The method of claim 1, wherein the invitation notification message is changed to the most recent message, in response to acquiring the interaction regarding the decision.

8. The method of claim 1, further comprising displaying information on a participant of the group chat room.

9. The method of claim 8, wherein the information on the participant, is displayed differently depending on whether the participant is registered as a friend of the first user in the messenger service.

10. The method of claim 1, further comprising:
deleting the chatroom information in response to acquiring an interaction regarding a decision to exit the group chat room through the interface.

11. The method of claim 1, further comprising:
in response to two or more participants including the second user creating messages,
before the first terminal acquiring the interaction, displaying information of the two or more participants on the group chat room without displaying the messages being created by the two or more participants on the group chat room; and
after the first terminal acquiring the interaction, displaying the messages being created by the two or more participants on the group chat room.

12. The method of claim 1, wherein the message comprises the most recent message.

13. A first user terminal for using a messenger service of a group chat room, the first user terminal comprising:
a memory storing instructions; and
a processor configured to execute the instructions to:
receive, from a server, invitation information associated with a second user's inviting a first user to the group chat room, each of the first user and the second user being registered in the messenger service;
display chat room information on the group chat room;
store a friend list of the first user;
determine that the second user is not registered as a friend of the first user in the messenger service by comparing the friend list of the first user with information regarding the second user;
display i) the information regarding the second user registered in the messenger service and an invitation notification message indicating occurrence of an invitation event without a most recent message created in the group chat room, on a first area of a screen of the first user terminal of the first user registered in the messenger service, and ii) an interface for deciding whether to participate in the group chat room on a second area of the screen of the first user terminal, the first area and the second area being different from each other and concurrently displayed on the screen;
acquire an interaction regarding a decision to participate in the group chat room through the interface; and
in response to the interaction regarding the decision being acquired, display a message created in the group chat room after reception of the invitation information.

* * * * *